(12) United States Patent
Kondo et al.

(10) Patent No.: US 8,634,275 B2
(45) Date of Patent: Jan. 21, 2014

(54) AUDIO PROCESSING DEVICE

(75) Inventors: Kazunobu Kondo, Hamamatsu (JP); Kenichi Yamauchi, Hamamatsu (JP); Hideki Kemmochi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 343 days.

(21) Appl. No.: 12/910,182

(22) Filed: Oct. 22, 2010

(65) Prior Publication Data

US 2011/0096631 A1 Apr. 28, 2011

(30) Foreign Application Priority Data

Oct. 22, 2009 (JP) .................................. 2009-243520

(51) Int. Cl.
*H04B 1/06* (2006.01)
(52) U.S. Cl.
CPC ...................................... *H04B 1/06* (2013.01)
USPC .......................................................... 367/135
(58) Field of Classification Search
USPC .......................................................... 367/135
See application file for complete search history.

(56) References Cited

U.S. PATENT DOCUMENTS

| | | | |
|---|---|---|---|
| 4,984,087 A | 1/1991 | Fujimura et al. | |
| 2005/0013443 A1* | 1/2005 | Marumoto et al. | 381/56 |
| 2005/0265563 A1* | 12/2005 | Maisano | 381/92 |
| 2006/0056646 A1* | 3/2006 | Bharitkar et al. | 381/98 |
| 2006/0075885 A1* | 4/2006 | Bailey et al. | 84/630 |
| 2006/0116779 A1* | 6/2006 | Seo et al. | 700/94 |
| 2006/0126858 A1* | 6/2006 | Larsen et al. | 381/63 |
| 2009/0028353 A1* | 1/2009 | Kobayashi et al. | 381/61 |

FOREIGN PATENT DOCUMENTS

| | | |
|---|---|---|
| EP | 1 202 602 A2 | 5/2002 |
| EP | 1 202 602 A3 | 5/2002 |
| JP | 05-260585 A | 10/1993 |
| JP | 06-303692 | 10/1994 |
| JP | 2002-204493 A | 7/2002 |
| JP | 2008-271532 | 11/2008 |
| JP | 2009-020471 | 1/2009 |
| WO | WO-2006/064699 A1 | 6/2006 |

OTHER PUBLICATIONS

European Search Report completed Feb. 8, 2011, for EP Application No. 10013861.9, seven pages.
Japanese Notice of Rejection mailed Apr. 2, 2013, for Japanese Patent Application No. 2009-243520; with English translation, 4 pages.

* cited by examiner

*Primary Examiner* — Isam Alsomiri
*Assistant Examiner* — James Hulka
(74) *Attorney, Agent, or Firm* — Morrison & Foerster LLP (57) ABSTRACT

In an audio processing device, a target sound emphasizer generates a target sound emphasized component by emphasizing a target sound component contained in a plurality of audio signals generated by a plurality of sound receiving devices. A stereo processor generates a stereo component of a plurality of channels from the plurality of audio signals. A first adjuster adjusts a sound pressure level of the target sound emphasized component according to a first adjustment value, and a second adjuster adjusts a sound pressure level of the stereo component according to a second adjustment value. A variable setter variably sets a zoom value which is changeable between a wide angle side and a telephoto side relative to a target. An adjustment controller controls the first adjustment value according to the zoom value such that the sound pressure level of the target sound emphasized component exponentially decreases as the zoom value changes toward the wide-angle side and controls the second adjustment value according to the zoom value such that the sound pressure level of the stereo component increases as the zoom value changes toward the wide-angle side.

10 Claims, 6 Drawing Sheets

AUDIO PROCESSING DEVICE

BACKGROUND OF THE INVENTION

1. Technical Field of the Invention

The present invention relates to a technology for variably controlling sound receiving characteristics such as directionality.

2. Description of the Related Art

For example, an audio zoom technology for changing sound receiving characteristics such as directionality according to a zoom value of a video camera has been suggested previously. Japanese Patent No. 3109938 discloses a configuration in which a coefficient defining directionality is changed stepwise or linearly according to the zoom value such that the directionality of received sound increases (i.e., as a sound-receiving angle decreases) as the zoom value approaches the telephoto side.

However, in the configuration in which the directionality is changed stepwise, the audio sound sounds unnatural since the acoustic characteristics change discontinuously according to the zoom value. If the coefficient defining directionality is changed linearly, discontinuous change in the acoustic characteristics may be suppressed. However, there is problem in that directionality changes unnaturally with respect to the zoom value since the relationship between the directionality and the zoom value is different from the relationship between acoustic characteristics heard in an actual acoustic space and the distance to the sound source.

SUMMARY OF THE INVENTION

In view of these circumstances, it is an object of the invention to naturally change sound receiving characteristics perceived by the listener.

In accordance with a first aspect of the invention to solve the above problem, there is provided an audio processing device for processing a plurality of audio signals generated by a plurality of sound receiving devices which receive a target sound component from a target in a predetermined direction, the audio processing device comprising: a target sound emphasis part that generates a target sound emphasized component by emphasizing the target sound component contained in the plurality of audio signals generated by the plurality of sound receiving devices; a stereo processing part that generates a stereo component of a plurality of channels from the plurality of audio signals; a first adjustment part that adjusts a sound pressure level of the target sound emphasized component generated by the target sound emphasis part according to a first adjustment value; a second adjustment part that adjusts a sound pressure level of the stereo component generated by the stereo processing part according to a second adjustment value; a first mixing part that mixes the target sound emphasized component adjusted by the first adjustment part and the stereo component adjusted by the second adjustment part with each other; a variable setting part that variably sets a zoom value which is changeable between a wide angle side and a telephoto side in relation to the target; and an adjustment control part that controls the first adjustment value according to the zoom value such that the sound pressure level of the target sound emphasized component adjusted by the first adjustment part exponentially decreases as the zoom value changes toward the wide-angle side, and that controls the second adjustment value according to the zoom value such that the sound pressure level of the stereo component adjusted by the second adjustment part increases as the zoom value changes toward the wide-angle side.

In this configuration, the first adjustment value is controlled such that the sound pressure level of the target sound emphasized component adjusted by the first adjustment part exponentially decreases as the zoom value changes toward the wide-angle side, and the second adjustment value is controlled such that the sound pressure level of the stereo component adjusted by the second adjustment part increases as the zoom value changes toward the wide-angle side. Namely, characteristics of an acoustic space (i.e., reverberation characteristics) that direct sound exponentially decreases and indirect sound increases as the distance between a sound source (target) and a sound receiving point increases are reflected in changes in the target sound emphasized component and the stereo component. Accordingly, it is possible to naturally change sound receiving characteristics perceived by the listener (i.e., in the same manner as changes in direct sound and indirect sound in an actual acoustic space). A specific example of the first aspect will be described later, for example, as a first embodiment.

How the sound pressure level of the stereo component changes (or increases) as the zoom value changes is arbitrary. Specifically, both a configuration in which the sound pressure level of the stereo component linearly changes as the zoom value changes (for example, the sound pressure level changes along a straight line with respect to the zoom value) and a configuration in which the sound pressure level of the stereo component nonlinearly changes as the zoom value changes (for example, the sound pressure level changes along a convex upward or downward curve with respect to the zoom value) are included in the scope of the invention.

The audio processing device according to a specific example of the first aspect further comprises a room constant setting part that variably sets a room constant which represents an acoustic feature of surroundings of the target, wherein the adjustment control part controls the first adjustment value and the second adjustment value according to the room constant such that a ratio of the sound pressure level of the stereo component to the sound pressure level of the target sound emphasized component decreases as the room constant increases.

In this aspect, characteristics of a plurality of acoustic spaces surrounding a target and having different acoustic characteristics (sound absorption coefficients or wall areas) can be reflected in changes in the target sound emphasized component or the stereo component, since the ratio of the sound pressure level of the stereo component to the sound pressure level of the target sound emphasized component is variably controlled according to the room constant. A specific example of this aspect will be described later, for example, as a third embodiment.

In accordance with a second aspect of the invention to solve the above problem, there is provided an audio processing device for processing a plurality of audio signals generated by a plurality of sound receiving devices which receive a target sound component from a target and a non-target sound component, the audio processing device comprising: a component separation part that separates the target sound component and the non-target sound component from each other contained in the plurality of audio signals generated by the plurality of sound receiving devices; a third adjustment part that adjusts a sound pressure level of the target sound component generated through separation by the component separation part according to a third adjustment value; a fourth adjustment part that adjusts the sound pressure level of the non-target sound component generated through separation by the component separation part according to a fourth adjustment value; a second mixing part that mixes the target sound component adjusted by the third adjustment part and the non-target sound component adjusted by the fourth adjustment part with each other; a variable setting part that variably sets a zoom value which is changeable between a wide angle side and a telephoto side in relation to the target; and an adjustment control part that controls the third adjustment value according to the zoom value such that the sound pressure level of the target sound component adjusted by the third adjustment part exponentially decreases as the zoom value changes toward the wide-angle side, and that controls the fourth adjustment value according to the zoom value such that the sound pressure level of the non-target sound component adjusted by the fourth adjustment part increases as the zoom value changes toward the wide-angle side.

In this configuration, the third adjustment value is controlled such that the sound pressure level of the target sound component adjusted by the third adjustment part exponentially decreases as the zoom value changes toward the wide-angle side and the fourth adjustment value is controlled such that the sound pressure level of the non-target sound component adjusted by the fourth adjustment part increases as the zoom value changes toward the wide-angle side. Namely, characteristics of an acoustic space (i.e., reverberation characteristics) that direct sound exponentially decreases and indirect sound increases as the distance between a sound source (target) and a sound receiving point increases are reflected in changes in the target sound component and the non-target sound component. Accordingly, it is possible to naturally change sound receiving characteristics perceived by the listener (i.e., in the same manner as changes in direct sound and indirect sound in an actual acoustic space). A specific example of the second aspect will be described later, for example, as a second embodiment.

The audio processing device according to a specific example of the second aspect further comprising a room constant setting part that variably sets a room constant which represents an acoustic feature of surroundings of the target, wherein the adjustment control part controls the third adjustment value and the fourth adjustment value according to the room constant such that a ratio of the sound pressure level of the non-target sound component to the sound pressure level of the target sound component decreases as the room constant increases.

In this aspect, characteristics of a plurality of acoustic spaces surrounding a target and having different acoustic characteristics (sound absorption coefficients or wall areas) can be reflected in changes in the target sound component or the non-target sound component since the ratio of the sound pressure level of the non-target sound component to the sound pressure level of the target sound component is variably controlled according to the room constant. A specific example of this aspect will be described later, for example, as the third embodiment.

The audio processing device according to each of the above aspects may not only be implemented by hardware (electronic circuitry) such as a Digital Signal Processor (DSP) dedicated to sound processing but may also be implemented through cooperation of a general arithmetic processing unit such as a Central Processing Unit (CPU) with a program. The invention provides a program that allows a computer to function as the audio processing device according to the first aspect and a program that allows a computer to function as the audio processing device according to the second aspect. Each of the programs of the invention may be provided to a user through a computer readable recording medium or machine readable storage medium storing the program and then installed on a computer and may also be provided from a server device to a user through distribution over a communication network and then installed on a computer.

DETAILED DESCRIPTION OF THE INVENTION

A: Reverberation Characteristics

An audio processing device 100 according to an embodiment of the invention has an audio zoom function to change the directionality of a received sound according to a variable zoom value (zoom magnification ratio). The relationship between a sound pressure level SPL of a sound, which has arrived at a sound receiving point after being generated by a sound source (target) in an acoustic space, and the distance r between the sound receiving point and the sound source is simulated and applied to directionality control according to the zoom value. The relationship between the sound pressure level SPL of sound arriving at the sound receiving point and the distance r between the sound receiving point and the sound source in an actual acoustic space is described below before explanation of specific embodiments of the invention.

The sound pressure level SPL(dB) of sound, which is a mixture of a direct sound and an indirect sound, in an acoustic space is expressed by the following Equation (1).

$$SPL[dB] = L_W + 10\log_{10}\left\{\frac{1}{4\pi r^2} + \frac{4}{R}\right\} \qquad (1)$$

In Equation (1), $L_W$ is a constant and a symbol r denotes the distance between the sound source and the sound receiving point. A symbol R denotes a room constant defined by the following Equation (2).

$$R = \frac{S\alpha}{1-\alpha} \qquad (2)$$

In Equation (2), a symbol $\alpha$ denotes an (average) sound absorption coefficient on a wall surface in an acoustic space and a symbol S denotes the total area of inner wall surfaces of the acoustic space. The room constant R represents an acoustic feature of surroundings of the target such as size and absorption. Accordingly, the room constant R increases as the sound absorption coefficient α or the area S increases.

Figure 1:
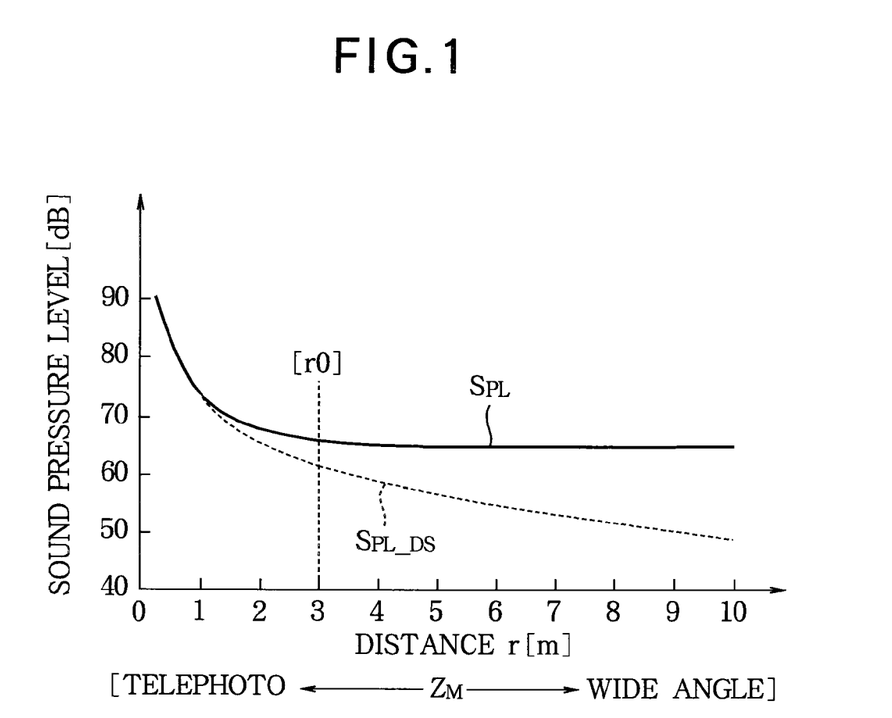
FIG. 1 is a graph showing a relationship between a distance from a sound source to a sound receiving point and the sound pressure level of a direct sound or an indirect sound.

A first term in parentheses on the right-hand side of Equation (1) corresponds to the strength of a direct sound that directly arrives at the sound receiving point from the sound source in the acoustic space (i.e., without undergoing reflection or diffusion at wall surfaces) and a second term in the parentheses of Equation (1) corresponds to the strength of an indirect sound that arrives at the sound receiving point in the acoustic space after undergoing reflection or diffusion at wall surfaces in the acoustic space. FIG. 1 is a graph showing a relationship between the distance r (horizontal axis) from the sound source to the sound receiving point and the sound pressure level SPL (vertical axis) of sound arriving at the sound receiving point. The sound pressure level SPL of a mixture of the direct sound and indirect sound is shown as a solid line and the sound pressure level SPL_DS of the direct sound (corresponding to the first term in the parentheses of Equation (1)) is shown as a dashed line. The difference between the sound pressure level SPL and the sound pressure level SPL_DS corresponds to the sound pressure level of the indirect sound.

As can be seen from FIG. 1, the sound pressure level SPL_DS of the direct sound decreases and the ratio of the sound pressure level of the indirect sound to the sound pressure level SPL_DS (or the ratio of the sound pressure level of the indirect sound to the sound pressure level SPL of the mixed sound) increases as the distance between the sound source and the sound receiving point increases. Specifically, the sound pressure level SPL_DS of the direct sound exponentially decreases as the distance r increases. That is, as can be understood from Equation (1), the sound pressure level SPL_DS of the direct sound is inversely proportional to the square of the distance r. On the other hand, the sound pressure level SPL of the mixture of the direct sound and the indirect sound is kept approximately constant in a range in which the distance r is greater than a specific value r0 (about 3 m). Accordingly, the sound pressure level of the indirect sound increases as the distance r increases. In addition, as can be understood from Equation (2), the sound pressure level of the indirect sound arriving at the sound receiving point increases as the room constant R decreases (i.e., as the sound absorption coefficient α or the area S decreases). The embodiments of the invention are described below based on such tendencies.

B: First Embodiment

Figure 2:
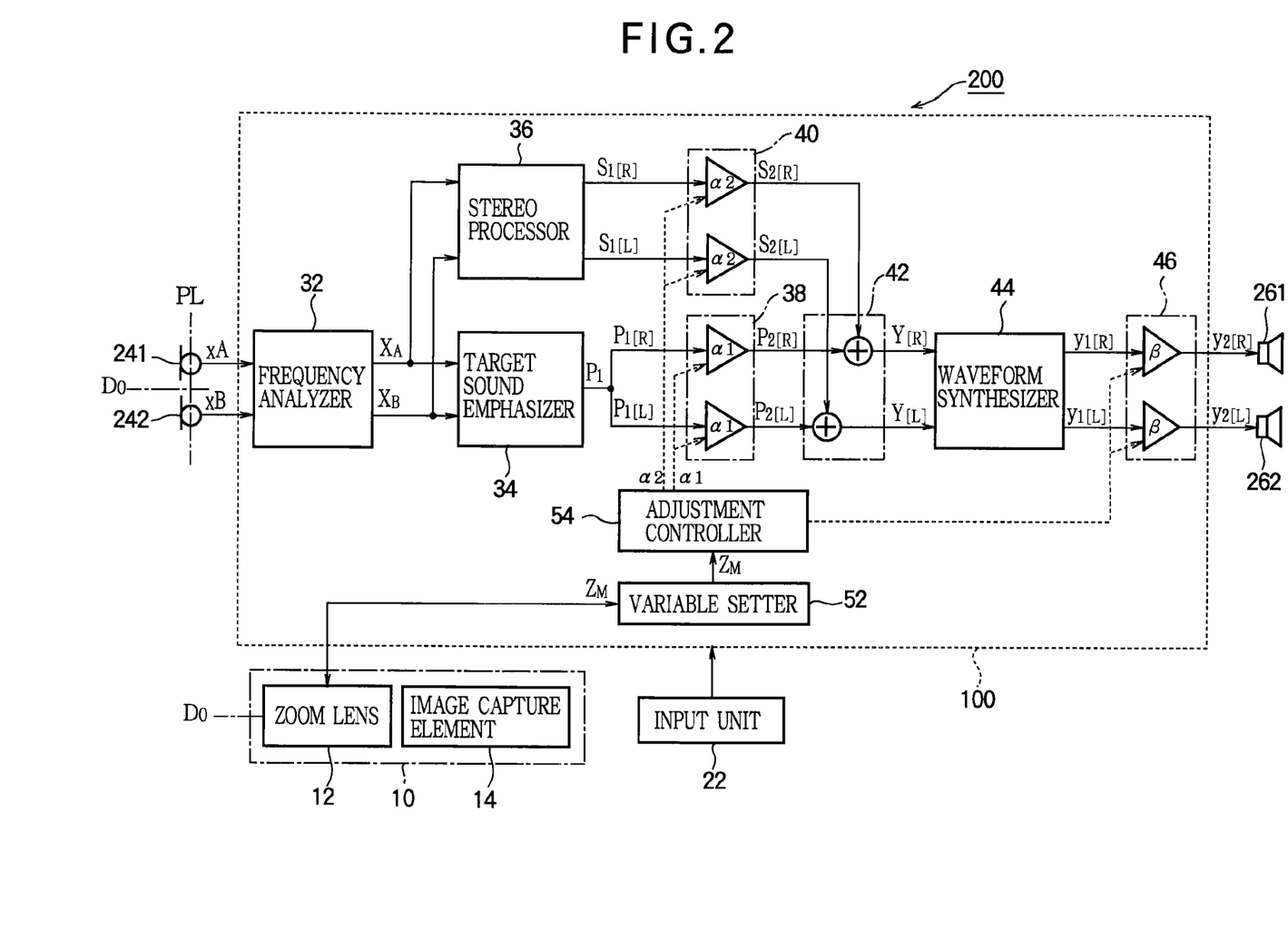
FIG. 2 is a block diagram of an image capture device according to a first embodiment.

FIG. 2 is a block diagram of an image capture device 200 using an audio processing device 100 according to a first embodiment of the invention. The image capture device 200 is a video camera that captures a moving image and receives sound and stores the moving image and sound in a recording medium. As shown in FIG. 2, the image capture device 200 includes an image capture processor 10, an input unit 22, a plurality of sound receiving devices 241 and 242 such as microphones, the audio processing device 100, and a plurality of sound emission devices 261 and 262.

The image capture processor 10 captures and stores a moving image. Specifically, the image capture processor 10 includes an image capture element 14 that generates image data according to incident light and a zoom lens 12 that forms an image of an object or target focused on the surface of the image capture element 14 according to the variable focal distance. The input unit 22 includes manipulators for receiving user manipulations. For example, the user can change a zoom value (zoom magnification ratio) ZM of the zoom lens 12 by appropriately manipulating the input unit 22.

The sound receiving device 241 and the sound receiving device 242 are nondirectional (approximately nondirectional) microphones, each of which generates a time-domain signal representing a waveform of ambient sound including a target sound component from a target and a non-target sound component. The sound receiving device 241 and the sound receiving device 242 are arranged with an interval therebetween in a plane PL perpendicular to a predetermined direction D0. The direction D0 is, for example, the direction of the optical axis of the zoom lens 12. The sound receiving device 241 generates an audio signal xA and the other sound receiving device 242 generates an audio signal xB. A mixed sound of a target sound and a non-target sound arrives at the sound receiving device 241 and the sound receiving device 242. Target sound components are components that arrive from the direction D0, which is the image capture direction of the image processing unit 10, and non-target sound components are components that arrive from a direction different from the direction D0.

The audio processing device 100 generates an audio signal y2[R] and an audio signal y2[L] by performing a process for variably controlling the directionalities of sounds received by the sound receiving device 241 and the sound receiving device 242 according to the zoom value ZM of the zoom lens 12. The sound emission device 261 emits a sound wave according to the audio signal y2[R], and the sound emission device 262 emits a sound wave according to the audio signal y2[L]. This allows the listener to perceive the directionality of received sound (the width of a range or angular range in which the sounds are received) corresponding to the zoom value ZM of the zoom lens 12. An A/D converter that converts the audio signals xA and xB to digital signals, a D/A converter that generates the analog audio signals y2[R] and y2[L], and the like are not illustrated for the sake of convenience and simplicity.

As shown in FIG. 2, the audio processing device 100 includes a plurality of components including a frequency analyzer 32, a target sound emphasizer (target sound emphasis part) 34, a stereo processor 36 (stereo processing part), a first adjuster (first adjustment part) 38, a second adjuster (second adjustment part) 40, a mixer (first mixing part) 42, a waveform synthesizer 44, an output adjuster (output adjustment part) 46, a variable (or parameter) setter (variable setting part) 52, and an adjustment controller (adjustment control part) 54. The components of the audio processing device 100 are implemented, for example, by a general-purpose arithmetic processing unit that executes a program. The invention may also employ a configuration in which each of the components of the audio processing device 100 is implemented by a dedicated electronic circuit (DSP) or a configuration in which each of the components is distributed over a plurality of integrated circuits.

The frequency analyzer 32 generates an audio signal XA and an audio signal XB in the frequency domain (i.e., in the frequency spectrum) from the audio signal xA and the audio signal xB of the time domain in each frame on the time axis. A known technology (for example, short-time Fourier transform) is employed to generate the audio signal XA and the audio signal XB.

The target sound emphasizer 34 generates target sound emphasized components P1, in which the target sound component arriving from the direction D0 is emphasized over the non-target sound component, from the audio signal XA and the audio signal XB. A known technology is arbitrarily employed to generate the target sound emphasized components P1 (i.e., to emphasize the target sound). For example, a beamforming technology for forming a beam, which corresponds to an angular range in which sound reception sensitivity is high, in the direction D0 of the target sound (for example, a delay-and-sum beamformer) is preferably used to generate the target sound emphasized components P1. As shown in FIG. 2, the target sound emphasized components P1 are separated into right channel components P1[R] and left channel components P1[L] which constitute a stereo signal.

Figure 3:
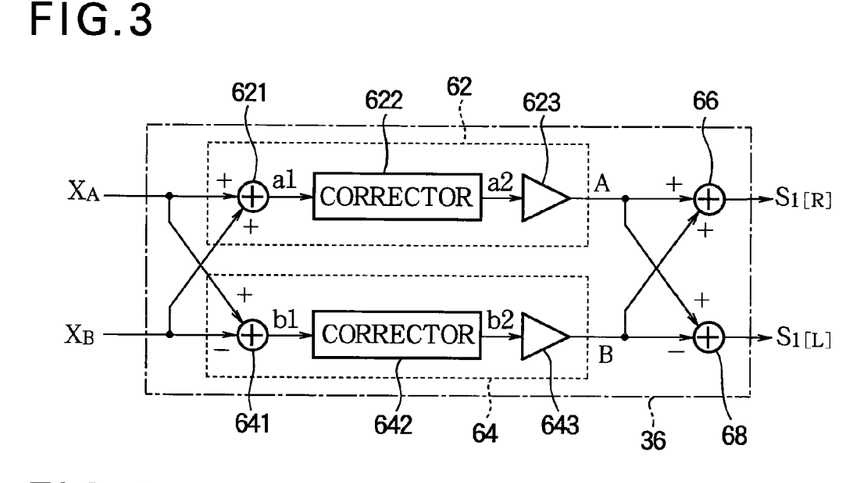
FIG. 3 is a block diagram of a stereo processor.

The stereo processor 36 generates stereo components S1 (S1[R], S1[L]), in which stereo effects (localization effects) are added or emphasized, from the audio signal XA and the audio signal XB. The stereo components S1 include right channel components S1[R] and left channel components S1[L] which constitute a stereo signal. FIG. 3 is a block diagram of the stereo processor 36. As shown in FIG. 3, the stereo processor 36 includes a first processor 62, a second processor 64, an adder 66, and a subtractor 68.

Figure 4:
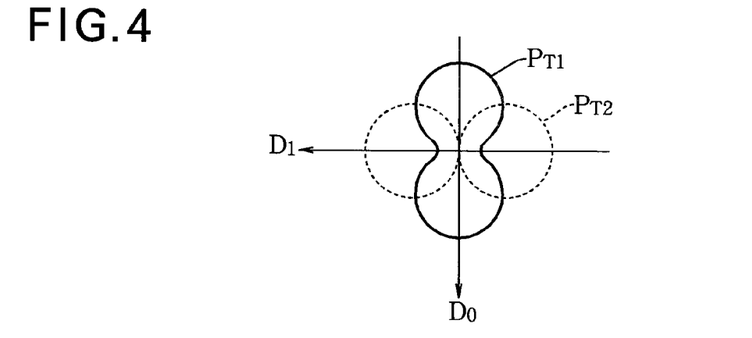
FIG. 4 is a schematic diagram illustrating the operation of the stereo processor.

The first processor 62 generates an intermediate signal A based on the sum of the audio signal XA and the audio signal XB. As shown in FIG. 3, the first processor 62 includes an adder 621, a corrector 622, and an amplifier 623. The adder 621 generates a signal a1 by summing the audio signal XA and the audio signal XB. Target sounds arriving at the sound receiving device 241 and the sound receiving device 242 from the direction D0 are in the same phase. Accordingly, the signal a1 output from the adder 621 has the same characteristics as when a sound receiving device (a Mid microphone of the Mid-Side Stereo microphone type) having directionality of the direction D0 is used as shown in a directionality pattern PT1 in FIG. 4. The strength of the target sound arriving from the direction D0 in the signal a1 is approximately doubled through the adder 621. Thus, the corrector 622 reduces the strength of the signal a1 (typically, by half) to generate a signal a2. The amplifier 623 amplifies the corrected signal a2 from the corrector 622 to generate an intermediate signal A.

The second processor 64 generates an intermediate signal B based on the difference between the audio signal XA and the audio signal XB. As shown in FIG. 3, the second processor 64 includes a subtractor 641, a corrector 642, and an amplifier 643. The subtractor 641 generates a signal b1 by subtracting the audio signal XB from the audio signal XA. Accordingly, the signal b1 output from the subtractor 641 has the same characteristics as when a sound receiving device (a Side microphone of the Mid-Side Stereo microphone type) having directionality of the direction D1, which is perpendicular to the direction D0 and in which the direction D0 is a blind angle, is used as shown in a directionality pattern PT2 in FIG. 4.

The audio signal XA and the audio signal XB are in opposite phase when a sound wave having a wavelength 20 corresponding to twice the interval between the sound receiving device 241 and the sound receiving device 242 has arrived from the direction D1. Accordingly, the strength of the signal b1, which is the difference between the audio signal XA and the audio signal XB, is maximized at a component of the frequency f0 corresponding to the wavelength λ and the strength of a component of the signal b1 decreases as the frequency of the component decreases compared to the frequency f0. Therefore, the corrector 642 corrects such frequency characteristics (i.e., unbalanced characteristics, such that strength increases as frequency increases) of the signal b1 to generate a signal b2. Specifically, the corrector 642 generates the signal b2 by reducing the strengths of high frequency components of the signal b1 relative to the strengths of low frequency components. The amplifier 643 amplifies the corrected signal b2 from the corrector 642 to generate an intermediate signal B.

The adder 66 sums the intermediate signal A generated by the first processor 62 and the intermediate signal B generated by the second processor 64 to generate right channel components S1[R] of the stereo components S1. The subtractor 68 subtracts the intermediate signal B from the intermediate signal A to generate left channel components S1[L]. That is, the stereo components S1 (s1[R], s1[L]) are generated using the intermediate signal A and the intermediate signal B as two output signals of the Mid and Side Stereo microphones.

Referring back to FIG. 2, the first adjuster 38 in FIG. 2 generates target sound emphasized components P2 (P2[R], P2[L]) by adjusting the sound pressure level of the target sound emphasized components P1 generated by the target sound emphasizer 34 according to an adjustment value α1. Specifically, the first adjuster 38 includes a multiplier that multiplies the right channel components P1[R] by the adjustment value α1 to generate right channel components P2[R] and a multiplier that multiplies the left channel components P1[L] by the adjustment value α1 to generate left channel components P2[L].

The second adjuster 40 in FIG. 2 generates stereo components S2 (S2[R], S2[L]) by adjusting the sound pressure level of the stereo components S1 generated by the stereo processor 36 according to an adjustment value α2. Specifically, similar to the first adjuster 38, the second adjuster 40 includes a multiplier that multiplies the right channel components S1[R] by the adjustment value α2 to generate right channel components S2[R] and a multiplier that multiplies the left channel components S1[L] by the adjustment value α2 to generate left channel components S2[L].

The mixer 42 generates audio signals Y (Y[R], Y[L]) of the frequency domain by mixing the target sound emphasized components P2 adjusted by the first adjuster 38 and the stereo components S2 adjusted by the second adjuster 40. Specifically, the mixer 42 includes an adder that sums the components P2[R] and the components S2[R] to generate an audio signal Y[R] of the right channel and an adder that sums the components P2[L] and the components S2[L] to generate an audio signal Y[L] of the left channel.

The waveform synthesizer 44 generates an audio signal y1[R] by converting an audio signal Y[R] (frequency spectrum) of each frame generated through processing by the mixer 42 into a signal of the time domain through inverse Fourier transform and then connecting adjacent frames to each other. Similarly, the waveform synthesizer 44 generates an audio signal y1[L] of the time domain from the audio signal Y[L] of the frequency domain. The output adjuster 46 adjusts the sound pressure levels of the audio signal y1[R] and the audio signal y1[L] according to an adjustment value β. Specifically, the output adjuster 46 includes a multiplier that multiples the audio signal y1[R] by the adjustment value β to generate an audio signal y2[R] and a multiplier that multiples the audio signal y1[L] by the adjustment value β to generate an audio signal y2[L].

The variable setter 52 in FIG. 2 variably sets the zoom value ZM according to a user manipulation of the input unit 22. The focal distance (image capture magnification ratio) of the zoom lens 12 is variably controlled according to the zoom value ZM. In the following description, it is assumed that the zoom value ZM decreases as the focal distance changes toward the wide-angle side. For example, the invention may employ a configuration in which the variable setter 52 sets the zoom value ZM according to a user manipulation of a zoom ring of the zoom lens 12.

The adjustment controller 54 variably sets each adjustment value (gain) that specifies the extent of adjustment of the sound pressure level according to the zoom value ZM set by the variable setter 52. Specific control of the adjustment values ($\alpha 1$, $\alpha 2$, $\beta$) by the adjustment controller 54 is described in detail below.

Figure 5:
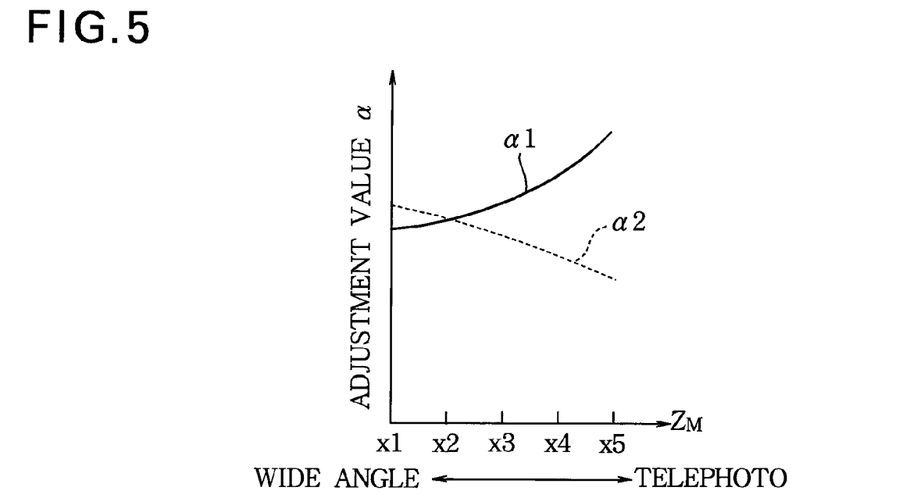
FIG. 5 is a graph showing the relationship between adjustment values and zoom values of target sound emphasized components and stereo components.

The direct sound in the target sound emphasized components P2 tends to dominate the indirect sound since the target sound emphasized components P2 are obtained by emphasizing the target sound arriving from the direction D0. Accordingly, the target sound emphasized components P2 are approximately regarded as a direct sound. Therefore, the adjustment controller 54 variably controls the adjustment value $\alpha 1$ of the first adjuster 38 according to the zoom value ZM such that the relationship between the zoom value ZM set by the variable setter 52 and the sound pressure levels of the target sound emphasized components P2 adjusted by the first adjuster 38 approximates the relationship between the distance r from the sound source to the sound receiving point and the sound pressure level SPL_DS of the direct sound. Specifically, as shown in FIG. 5, the adjustment controller 54 controls the adjustment value $\alpha 1$ such that the sound pressure levels of the target sound emphasized components P2 (P2[R], P2[L]) adjusted by the first adjuster 38 exponentially decrease as the zoom value ZM changes toward the wide-angle side (i.e., as the distance r increases). For example, the adjustment value $\alpha 1$ is set such that it is proportional to the square of the zoom value ZM.

On the other hand, the indirect sound in the stereo components S2 tends to dominate the direct sound since the stereo components S2 are obtained by emphasizing the difference between sounds arriving from surrounding (left and right) sides of the direction D0. Accordingly, the stereo components S2 are approximately regarded as an indirect sound. Therefore, the adjustment controller 54 variably controls the adjustment value $\alpha 2$ of the second adjuster 40 according to the zoom value ZM such that the relationship between the zoom value ZM set by the variable setter 52 and the sound pressure levels of the stereo components S2 adjusted by the second adjuster 40 approximates the relationship between the distance r from the sound source to the sound receiving point and the sound pressure level of the indirect sound. Specifically, as shown in FIG. 5, the adjustment controller 54 controls the adjustment value $\alpha 2$ such that the sound pressure levels of the stereo components S2 (S2[R], S2[L]) adjusted by the second adjuster 40 increase when the zoom value ZM has changed toward the wide-angle side (i.e., when the distance r has increased).

That is, the adjustment controller 54 variably controls the adjustment value $\alpha 1$ and the adjustment value $\alpha 2$ (i.e., the ratio between the adjustment values $\alpha 1$ and $\alpha 2$) such that the ratio of the sound pressure levels of the stereo components S2 to the sound pressure levels of the target sound emphasized components P2 increases as the zoom value ZM approaches the wide-angle side (i.e., as the distance r increases) taking into consideration the tendency of FIG. 1 that the ratio of the sound pressure level of the indirect sound to the sound pressure level of the direct sound (or to the mixed sound of the direct sound and indirect sound) increases as the distance r increases. Especially, in the case where the zoom value ZM has changed (decreased) toward the wide-angle side in a range of values which are nearer to the wide-angle side than a predetermined value corresponding to the distance r0 of FIG. 1, the ratio of the sound pressure levels of the stereo components S2 to the sound pressure levels of the target sound emphasized components P2 increases while the sum of the sound pressure levels of the target sound emphasized components P2 and the stereo components S2 is kept approximately constant as can be understood from FIG. 1.

The audio signals y2 (y2[R], y2[L]) obtained through mixture of the target sound emphasized components P2 and the stereo components S2 can be regarded as a mixed sound (corresponding to the sound pressure level SPL of FIG. 1) of the direct sound and the indirect sound. Therefore, the adjustment controller 54 variably controls the adjustment value $\beta$ of the output adjuster 46 according to the zoom value ZM such that the relationship between the zoom value ZM set by the variable setter 52 and the audio signals y2 (y2[R], y2[L]) adjusted by the output adjuster 46 approximates the relationship between the distance r from the sound source to the sound receiving point and the sound pressure level SPL of the mixed sound. Specifically, the adjustment controller 54 controls the adjustment value $\beta$ such that the sound pressure levels of the audio signals y2 (y2[R], y2[L]) adjusted by the output adjuster 46 increase when the zoom value ZM has changed (increased) toward the telephoto side in a range of values which are nearer to the telephoto side than the predetermined value corresponding to the distance r0 shown in FIG. 1. Namely, the audio processing device further comprises an output adjustment part in the form of the output adjuster 46 that adjusts a sound pressure level of a mixture of the target sound emphasized component and the stereo component provided from the first mixing part in the form of the first mixer 42 according to an output adjustment value $\beta$. The adjustment control part in the form of the adjustment controller 54 controls the output adjustment value $\beta$ according to the zoom value ZM such that the sound pressure level of the mixture of the target sound emphasized component and the stereo component increases as the zoom value ZM changes toward the telephoto side beyond a predetermined zoom value.

Since the adjustment value $\alpha 1$ and the adjustment value $\alpha 2$ are controlled as described above, audio signals y2 in which the stereo components S2 are emphasized over the target sound emphasized components P2 are generated as the focal distance of the zoom lens 12 approaches the wide-angle side (i.e., as the range of image capture by the image capture processor 10 increases). On the other hand, audio signals y2 in which the target sound emphasized components P2 are emphasized over the stereo components S2 are generated as the focal distance of the zoom lens 12 approaches the telephoto side (i.e., as the range of image capture by the image capture processor 10 decreases). That is, it is possible to allow the listener to clearly perceive sound present within the range of image capture by the image capture processor 10. In addition, it is possible to naturally change the sound receiving characteristics perceived by the listener according to the zoom value ZM (i.e., in the same manner as in an actual acoustic space) since the change of (the ratio between) the sound pressure levels of the target sound emphasized components P2 and the stereo components S2 approximates the change of the sound pressure level of the direct sound or indirect sound and the distance r from the sound source to the sound receiving point in the acoustic space.

C: Second Embodiment

Next, a second embodiment of the invention is described as follows. The second embodiment is a specific example of the target sound emphasizer 34. In each example described below, elements having the same operations and functions as those of the first embodiment are denoted by the same reference numerals as described above and detailed descriptions thereof are omitted as appropriate.

Figure 6:
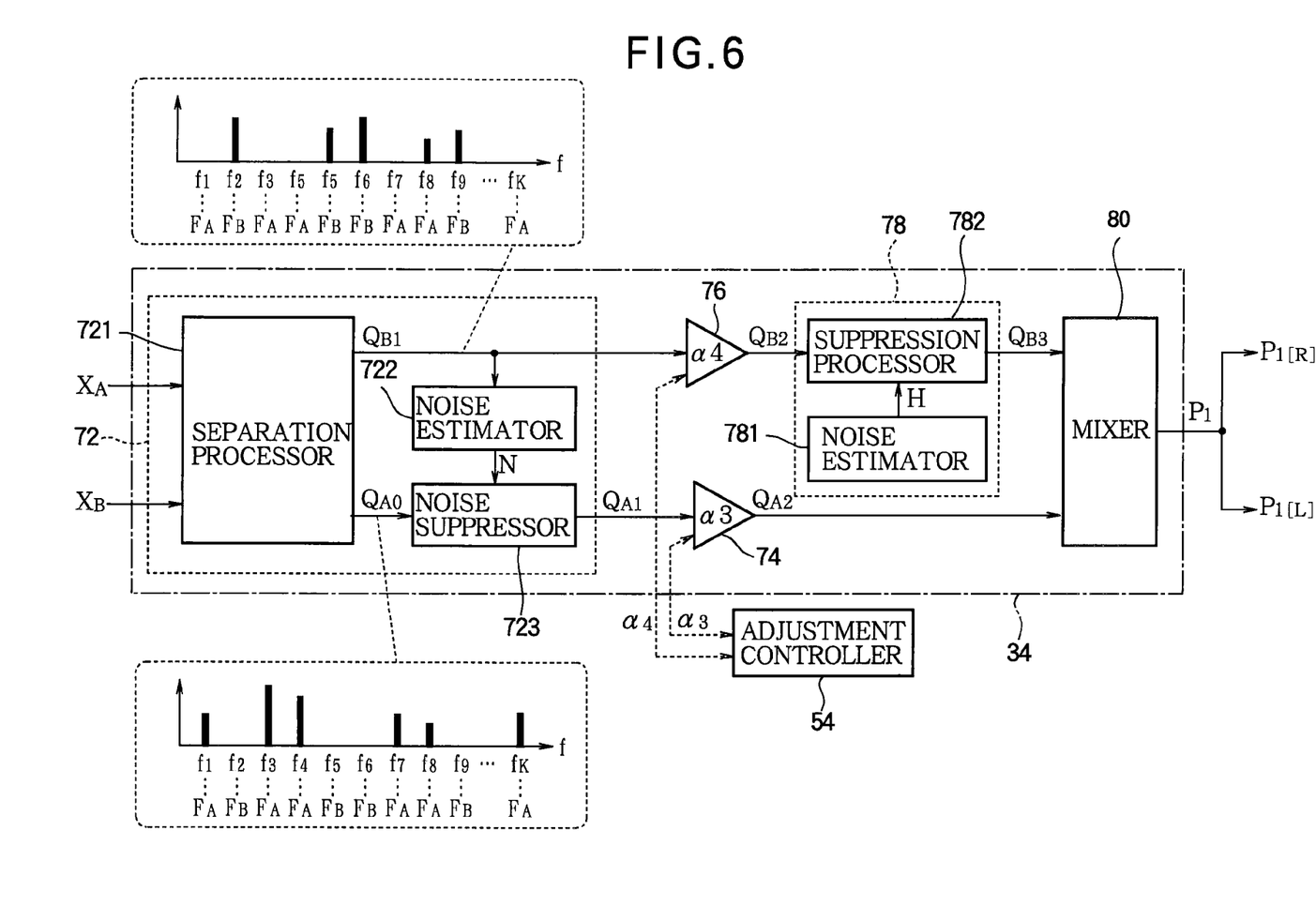
FIG. 6 is a block diagram of a target sound emphasizer in a second embodiment.

FIG. 6 is a block diagram of the target sound emphasizer 34 in the second embodiment. As shown in FIG. 6, the target sound emphasizer 34 includes a component separator (component separation part) 72, a third adjuster (third adjustment part) 74, a fourth adjuster (fourth adjustment part) 76, a fluctuating sound suppressor 78, and a mixer (second mixing part) 80. The component separator 72 generates target sound components QA1 in which a target sound is dominant and non-target sound components QB1 in which a non-target sound is dominant from an audio signal XA and an audio signal XB in each frame. As shown in FIG. 6, the component separator 72 includes a separation processor 721, a noise estimator 722, and a noise suppressor 723.

The separation processor 721 selects K frequencies (frequency bands) f1 to fK (K: natural number) set on the frequency axis as target sound frequencies FA and non-target sound frequencies FB in each frame and generates target sound components QA0 including the components of the target sound frequencies FA and non-target sound components QB1 including the components of the non-target sound frequencies FB as shown in FIG. 6. The target sound frequencies FA are frequencies at which the target sound is dominant (typically frequencies at which the volume of the target sound is greater than that of the non-target sound) and the non-target sound frequencies FB are frequencies at which the non-target sound is dominant (typically frequencies at which the volume of the non-target sound is greater than that of the target sound). A method which uses the difference between the target sound and the non-target sound as illustrated below (for example, a method described in Patent Application Publication No. 2006-197552) is preferably employed to select the target sound frequencies FA and the non-target sound frequencies FB.

Figure 7:
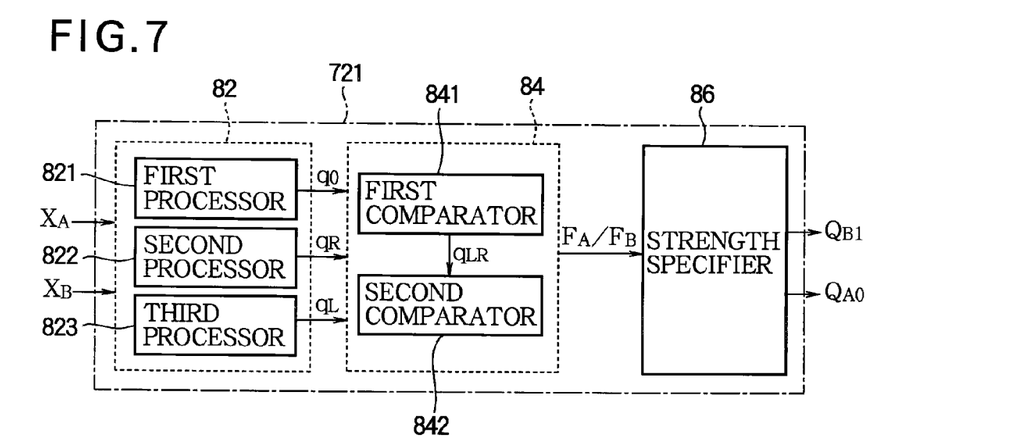
FIG. 7 is a block diagram of a separation processor.
Figure 8:
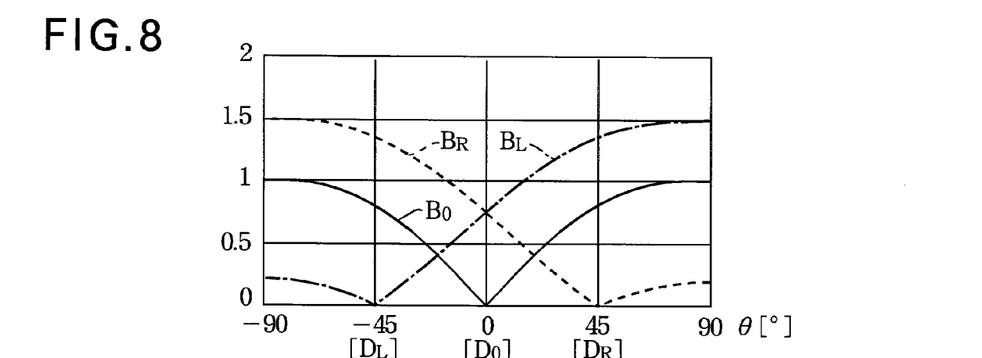
FIG. 8 is a schematic diagram illustrating the operation of the separation processor.

FIG. 7 is a block diagram of the separation processor 721. As shown in FIG. 7, the separation processor 721 includes a signal processor 82, a frequency selector 84, and a strength specifier 86. The signal processor 82 includes a first processor 821, a second processor 822, and a third processor 823. FIG. 8 illustrates details of processing by the signal processor 82. In FIG. 8, the horizontal axis represents an angle θ with respect to the direction D0 of the target sound as a reference (0°) and the vertical axis represents the strength (power) of a signal.

The first processor 821 generates components q0 by forming a beam whose sound reception blind spot (i.e., low sound reception sensitivity zone) is the direction D0 of the target sound as shown by a symbol B0 (solid line) in FIG. 8. The second processor 822 generates components qR by forming a beam whose sound reception blind spot is a direction DR different from the direction D0 as shown by a symbol BR (dashed line) in FIG. 8. Similarly, the third processor 823 generates components qL by forming a beam whose sound reception blind spot is a direction DL different from the direction D0 as shown by a symbol BL (dashed-dotted line) in FIG. 8.

The frequency selector 84 in FIG. 7 includes a first comparator 841 and a second comparator 842. The first comparator 841 generates components qLR by comparing the strengths of the components qR and the strengths of the components qL at the K frequencies f1 to fK, respectively. The respective strengths of the components qLR at the frequencies fk are set to the lower ones of the strengths of the components qR and the strengths of the components qL at the frequencies fk. Since the components qR are components in which the non-target sound arriving from the direction DR is suppressed and the components qL are components in which the non-target sound arriving from the direction DL is suppressed, the components qLR correspond to components in which sound arriving in both the directions DR and DL is suppressed (i.e., components in which the target sound arriving from the direction D0 is emphasized).

The second comparator 842 compares the strengths of the components qLR and the strengths of the components q0 at the K frequencies f1 to fK, respectively. The components q0 are components in which the non-target sound is emphasized and the components qLR are components in which the target sound is emphasized. Therefore, the second comparator 842 selects frequencies fk at which the strengths of the components qLR are greater than the strengths of the components q0 as target sound frequencies FA and selects frequencies fk at which the strengths of the components q0 are greater than the strengths of the components qLR as non-target sound frequencies FB.

The strength specifier 86 in FIG. 7 generates target sound components QA0 and non-target sound components QB1 in each frame using the results of selection by the frequency selector 84. As described above, the non-target sound is emphasized in the components q0 and the target sound is emphasized in the components qLR. Therefore, the strength specifier 86 sets the strengths of the components of the frequencies fk selected as the target sound frequencies FA among the target sound components QA0 respectively to values obtained by subtracting the strengths of the frequencies fk of the components q0 (i.e., the strengths originating primarily from the non-target sound) from the strengths of the frequencies fk of the components qLR (i.e., the strengths originating primarily from the target sound) (through spectral subtraction). On the other hand, the strengths of the components of the frequencies fk selected as the non-target sound frequencies FB among the target sound components QA0 are set to zero.

Similarly, the strength specifier 86 sets the strengths of the components of the frequencies fk selected as the non-target sound frequencies FB among the non-target sound components QB1 respectively to values obtained by subtracting the strengths of the frequencies fk of the components qLR (i.e., the strengths originating primarily from the target sound) from the strengths of the frequencies fk of the components q0 (i.e., the strengths originating primarily from the non-target sound). On the other hand, the strengths of the components of the frequencies fk selected as the target sound frequencies FA among the non-target sound components QB1 are set to zero.

Referring back to FIG. 6, the non-target sound components QB1 may include a fluctuating non-target sound from a direction different from the target sound in addition to a constant non-target sound which does not vary with time (i.e., a non-target sound undergoing a slight change in acoustic characteristics such as volume or pitch). The constant non-target sound corresponds to, for example, operating noise of air-conditioning equipment or noise in crowds and the fluctuating non-target sound is an interfering sound such as a vocal sound (speech sound) or musical sound which changes in acoustic characteristics such as volume or pitch from moment to moment. The noise estimator 722 in FIG. 6 generates constant noise components N (frequency spectrum) by averaging (or smoothing) the non-target sound components QB1 over a plurality of frames. The constant non-target sound is dominant in the constant noise components N since the fluctuating non-target sound is suppressed through averaging over the plurality of frames. The noise suppressor 723 generates target sound components QA1 by subtracting the constant noise components N from the target sound components QA0 generated by the separation processor 721 (through spectral subtraction). As described above, the component separation part in the form of the component separator 72 includes a noise estimating part in the form of the noise estimator 722 that estimates a noise component from the non-target sound component, and a noise suppressing part in the form of the noise suppressor 723 that subtracts the estimated noise component from the target sound component so as to suppress the noise component in the target sound component.

The non-target sound is suppressed through processing by the strength specifier 86 alone since the strength specifier 86 generates the target sound components QA0 by subtracting the components q0 in which the non-target sound is emphasized from the components qLR in which the target sound is emphasized. However, for example, when a constant non-target sound is included in a sound arriving from the direction D0, the constant non-target sound cannot be sufficiently suppressed through processing by the strength specifier 86. The configuration of FIG. 6 has an advantage in that a constant non-target sound from the direction D0 is efficiently suppressed since the noise suppressor 723 subtracts the constant noise components N from the target sound components QA0. The noise estimator 722 or the noise suppressor 723 is omitted when a constant non-target sound arriving from the direction D0 causes no significant affect. Details of the component separator 72 have been described above.

The third adjuster 74 in FIG. 6 generates target sound components QA2 by adjusting the sound pressure levels of the target sound components QA1 generated by the component separator 72 according to an adjustment value α3. Specifically, a multiplier that multiplies the target sound components QA1 by the adjustment value α3 is employed as the third adjuster 74. Similarly, the fourth adjuster 76 in FIG. 6 generates non-target sound components QB2 by adjusting the sound pressure levels of the non-target sound components QB1 generated by the component separator 72 according to an adjustment value α4 (for example, by multiplying the non-target sound components QB1 by the adjustment value α4). The non-target sound components QB2 adjusted by the fourth adjuster 76 include a constant non-target sound and a fluctuating non-target sound. The fluctuating sound suppressor 78 in FIG. 6 generates non-target sound components QB3 by suppressing the fluctuating non-target sound among the non-target sound components QB2.

As shown in FIG. 6, the fluctuating sound suppressor 78 includes a noise estimating part in the form of a noise estimator 781 and a suppression processing part in the form of a suppression processor 782. The noise estimator 781 generates a suppression gain series H for suppressing the fluctuating non-target sound from the non-target sound components QB2 in each frame. The suppression gain series H includes K (spectral) gains h(f1) to h(fK) corresponding to the frequencies f1 to fK. Each of the gains h(f1) to h(fK) is individually set for each frequency fk within a range of positive numbers less than 1.

The suppression processor 782 generates non-target sound components QB3, which suppress the fluctuating non-target sound in the non-target sound components QB2, by adjusting the non-target sound components QB2 according to the suppression gain series H. Specifically, the strengths ξ3(fk) at the frequencies fk of the non-target sound components QB3 is set respectively to the products of the strengths ξ2(fk) of the frequencies fk of the non-target sound components QB2 and the gains h(fk) of the frequencies fk of the suppression gain series H (i.e., ξ3(fk)=ξ2(fk)·h(fk)). The gains h(f1) to f(fK) of the suppression gain series H are set so as to suppress the fluctuating non-target sound. That is, a gain h(fk) of the component of a frequency fk, at which the fluctuating non-target sound is more highly likely to be dominant, among the non-target sound components QB2 is set to a lower value. Namely, the component separator 34 includes a noise estimator 781 that generates a suppression gain series for suppressing a fluctuating non-target sound contained in the non-target sound component, and a suppression processor 782 that suppresses the fluctuating non-target sound in the non-target sound components by adjusting the non-target sound component according to the suppression gain series.

First, the noise estimator 781 generates an emphasizing gain series G including K gains g(f1) to g(fK) in each frame. The K gains g(f1) to g(fK) are selected so as to emphasize the fluctuating non-target sound (typically, a vocal sound) when the non-target sound components QB2 are multiplied by the K gains g(f1) to g(fK). That is, a gain g(fk) of the component of a frequency fk, at which the fluctuating non-target sound is more highly likely to be dominant, among the non-target sound components QB2 is set to a higher value. The constant noise components N generated by the noise estimator 781 and the non-target sound components QB2 adjusted by the fourth adjuster 76 are used to generate the emphasizing gain series G.

Second, the noise estimator 781 generates a suppression gain series H from the emphasizing gain series G. The suppression gain series H is generated so as to have characteristics (i.e., characteristics that suppress the fluctuating non-target sound) opposite to those of the emphasizing gain series G which emphasize the fluctuating non-target sound. For example, the noise estimator 781 calculates the gains h(fk) of the frequencies fk of the suppression gain series H by subtracting the gains g(fk) of the frequencies fk of the emphasizing gain series G from a predetermined value (for example, 1) (i.e., h(fk)=1−g(fk)).

A known technology is arbitrarily employed by the noise estimator 781 to generate the emphasizing gain series G. For example, an MMSE-STSA method described in Y. Ephraim and D. Malah, "Speech enhancement using a minimum mean square error short-time spectral amplitude estimator", IEEE Trans. ASSP, Vol. 32, No. 6, p. 1109-1121, December 1984, or maximum a posteriori estimation (MAP) described in T, Lotter and P, Vary, "Speech enhancement by MAP spectral amplitude estimation using a Super-Gaussian speech model", EURASIP Journal on Applied Signal Processing, vol. 2005, no. 7, p. 1110-1126, July 2005 is preferably employed to generate the emphasizing gain series G.

The mixer 80 in FIG. 6 generates target sound emphasized components P1 in each frame by combining the non-target sound components QB3 in which the fluctuating non-target sound is suppressed and the target sound components QA2 adjusted by the third adjuster 74 in the above procedure. The target sound emphasized components P1 are a series of strengths of components (frequency spectrum) arranged along the frequency axis, the components including components of frequencies fk selected as target sound frequencies FA among the target sound components QA2 and the components of frequencies fk selected as non-target sound frequencies FB among the non-target sound components QB3. As shown in FIG. 6, the target sound emphasized components P1 are separated into right channel components P1[R] and left channel components P1[L].

In a configuration where the target sound emphasized components P1 are generated from only the target sound components QA2, components scattered along the time axis and the frequency axis among the target sound components QA2 are perceived as artificial and harsh musical noise by the listener. In the second embodiment, it is possible to suppress musical noise, compared to the configuration where the target sound emphasized components 21 are generated from only the target sound components QA2, since the target sound components QA2 and the non-target sound components QB3 are combined as described above. In addition, in the configuration where the target sound emphasized components 21 are generated from only the target sound components QA2, a fluctuating non-target sound included in the adjusted non-target sound components QB2 is emphasized when the adjustment value α3 of the third adjuster 74 is set to a large value. The first embodiment has an advantage in that the target sound emphasized components 21 in which the fluctuating non-target sound is effectively suppressed are generated even when the adjustment value α3 is set to a large value since the fluctuating sound suppressor 78 suppresses the fluctuating non-target sound of the non-target sound components QB2. The fluctuating sound suppressor 78 may be omitted when the fluctuating non-target sound causes no significant affect.

Similar to the first embodiment, the adjustment controller 54 of the second embodiment not only adjusts the adjustment values (α1, α2, β) but also variably controls the adjustment value α3 and the adjustment value α4 applied to the target sound emphasizer 34 according to the zoom value ZM. Control of the adjustment values (α3, α4) by the adjustment controller 54 is described below in detail.

Figure 9:
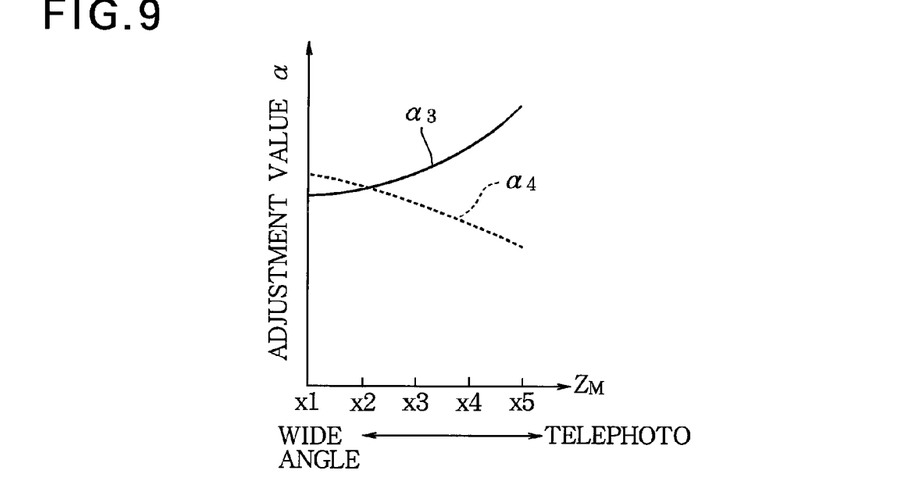
FIG. 9 is a graph showing the relationship between adjustment values and zoom values of target sound components and non-target sound components.

The target sound components QA2 in which the target sound from the direction D0 is emphasized are approximately regarded as a direct sound. Therefore, the adjustment controller 54 variably controls the adjustment value α3 of the third adjuster 74 according to the zoom value ZM such that the relationship between the zoom value ZM set by the variable setter 52 and the sound pressure levels of the target sound components QA2 adjusted by the third adjuster 74 approximates the relationship between the distance r from the sound source to the sound receiving point and the sound pressure level SPL_DS of the direct sound. Specifically, as shown in FIG. 9, the adjustment controller 54 controls the adjustment value α3 such that the sound pressure levels of the target sound components QA2 adjusted by the third adjuster 74 exponentially decrease as the zoom value ZM changes toward the wide-angle side (i.e., as the distance r increases). For example, the adjustment value α3 is set such that it is proportional to the square of the zoom value ZM.

On the other hand, the non-target sound components QB2 are approximately regarded as an indirect sound. Therefore, the adjustment controller 54 variably controls the adjustment value α4 of the fourth adjuster 76 according to the zoom value ZM such that the relationship between the zoom value ZM set by the variable setter 52 and the sound pressure levels of the non-target sound components QB2 adjusted by the fourth adjuster 76 approximates the relationship between the distance r from the sound source to the sound receiving point and the sound pressure level of the indirect sound. Specifically, as shown in FIG. 9, the adjustment controller 54 controls the adjustment value α4 such that the sound pressure levels of the non-target sound components QB2 adjusted by the fourth adjuster 76 increase when the zoom value ZM has changed toward the wide-angle side.

Namely, the adjustment controller 54 variably controls the adjustment value α3 and the adjustment value α4 (i.e., the ratio between the adjustment values α3 and a4) such that the ratio of the sound pressure levels of the non-target sound components QB2 to the sound pressure levels of the target sound components QA2 increases as the zoom value ZM approaches the wide-angle side taking into consideration the tendency of FIG. 1 that the ratio of the sound pressure level of the indirect sound to the sound pressure level of the direct sound (or to the mixed sound of the direct sound and indirect sound) increases as the distance r increases. Especially, in the case where the zoom value ZM has changed (decreased) toward the wide-angle side in a range of values which are nearer to the wide-angle side than the predetermined value corresponding to the distance r0 of FIG. 1, the ratio of the sound pressure levels of the non-target sound components QB2 to the sound pressure levels of the target sound components QA2 increases while the sum of the sound pressure levels of the target sound components QA2 and the non-target sound components QB2 is kept at a specific value as can be understood from FIG. 1.

Since the adjustment value α3 and the adjustment value α4 are controlled as described above, the non-target sound components QB2 (or QB3) in the target sound emphasized components P1 are emphasized as the focal distance of the zoom lens 12 approaches the wide-angle side. On the other hand, the target sound components QA2 in the target sound emphasized components P1 are emphasized as the focal distance of the zoom lens 12 approaches the telephoto side. That is, it is possible to allow the listener to clearly perceive sound present within the range of image capture by the image capture processor 10. In addition, similar to the first embodiment, it is possible to naturally change the sound receiving characteristics perceived by the listener according to the zoom value ZM since the change of (the ratio between) the sound pressure levels of the target sound components QA2 and the non-target sound components QB2 approximates the change of the sound pressure level of the direct sound or indirect sound and the distance r from the sound source to the sound receiving point in the acoustic space.

Although not only adjustment of the sound pressure levels of the target sound emphasized components P2 and the stereo components S2 but also adjustment of the sound pressure levels of the target sound components QA2 and the non-target sound components QB2 are employed in the above embodiment, adjustment of the sound pressure levels of the target sound emphasized components P2 and the stereo components S2 may be omitted in the second embodiment. In addition, a configuration in which generation of the stereo components S1 by the stereo processor 36 is omitted may also be employed in the second embodiment.

D: Third Embodiment

Figure 10:
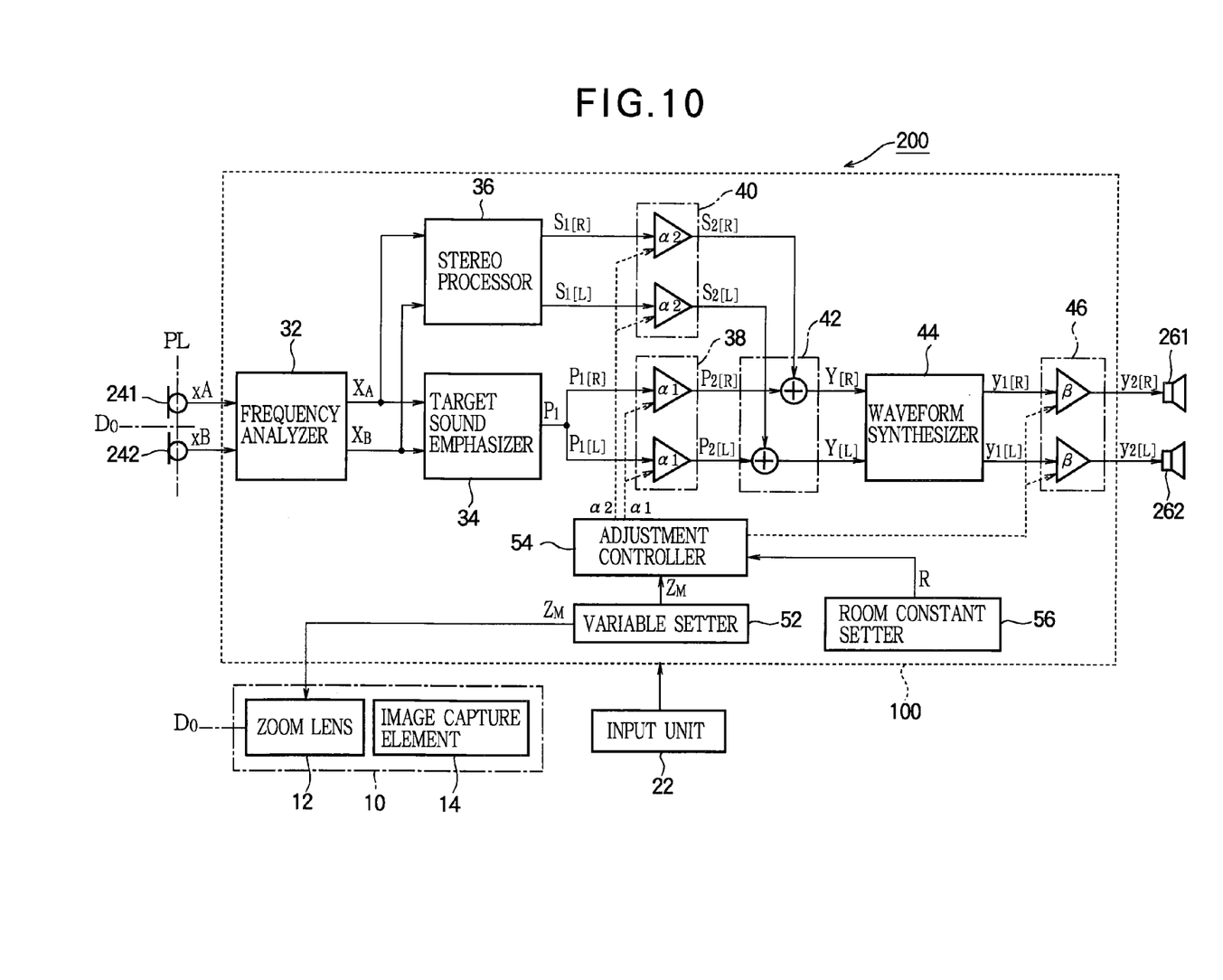
FIG. 10 is a block diagram of an image capture device in a third embodiment.

FIG. 10 is a block diagram of an audio processing device 100 according to a third embodiment of the invention. As shown in FIG. 10, the audio processing device 100 of the third embodiment is constructed by adding a room constant setting part in the form of a room constant setter 56 to the audio processing device 100 of the first embodiment. The room constant setter 56 variably sets a room constant R according to a user manipulation of the input unit 22.

As can be understood from the above Equation (1), the ratio of the sound pressure level of the indirect sound to the sound pressure level of the direct sound tends to decrease as the room constant R increases (i.e., as the area S or the sound absorption coefficient α of the acoustic space increases). In the third embodiment, the adjustment controller 54 variably controls the adjustment values α1 to α4 according to the zoom value ZM and the room constant R so that such a tendency is reflected in changes of the sound pressure levels of the target sound emphasized components P2 and the stereo components S2 or changes of the sound pressure levels of the target sound components QA2 and the non-target sound components QB2.

Specifically, the adjustment controller 54 controls the adjustment value α1 and the adjustment value α2 so that the ratio of the sound pressure level of the stereo components S2 (indirect sound) to the sound pressure level of the target sound emphasized components P2 (direct sound) decreases as the room constant R set by the room constant setter 56 increases. For example, the adjustment controller 54 sets the adjustment value $\alpha 1$ and the adjustment value $\alpha 2$ so that the ratio of the adjustment value $\alpha 2$ to the adjustment value $\alpha 1$ (i.e., $\alpha 2/\alpha 1$) is inversely proportional to the room constant R. The tendency of increase or decrease of the adjustment value $\alpha 1$ or the adjustment value $\alpha 2$ according to the zoom value ZM is similar to the first embodiment.

In addition, the adjustment controller 54 controls the adjustment value $\alpha 3$ and the adjustment value $\alpha 4$ so that the ratio of the sound pressure level of the non-target sound components QB2 (indirect sound) to the sound pressure level of the target sound components QA2 (direct sound) decreases as the room constant R set by the room constant setter 56 increases. For example, the adjustment controller 54 sets the adjustment value $\alpha 3$ and the adjustment value $\alpha 4$ so that the ratio of the adjustment value $\alpha 4$ to the adjustment value $\alpha 3$ (i.e., $\alpha 4/\alpha 3$) is inversely proportional to the room constant R. The tendency of increase or decrease of the adjustment value $\alpha 3$ or the adjustment value $\alpha 4$ according to the zoom value ZM is similar to the second embodiment.

According to the above configurations, it is possible to allow the relationship between the zoom value ZM and the sound pressure levels of the target sound emphasized components P2 and the stereo components S2 or the relationship between the zoom value ZM and the sound pressure levels of the target sound components QA2 and the non-target sound components QB2 to approximate the relationship between the distance r from the sound source to the sound receiving point in environments having various acoustic characteristics and the ratio of the sound pressure levels of direct and indirect sounds. For example, when the room constant R is set to a high value, the adjustment values $\alpha 1$ to $\alpha 4$ are set so as to simulate the relationship between the sound pressure level and the distance r in an acoustic space having a large sound absorption coefficient $\alpha$ or a large area S (for example, a large space or an outdoor space). On the other hand, when the room constant R is set to a low value, the adjustment values $\alpha 1$ to $\alpha 4$ are set so as to simulate the relationship between the sound pressure level and the distance r in an acoustic space having a small sound absorption coefficient $\alpha$ or a small area S (for example, a small indoor space). The invention preferably employs a configuration in which the user can select an outdoor mode (i.e. a mode suitable for outdoor use) in which the room constant R is set to a high value or an indoor mode (i.e. a mode suitable for indoor use) in which the room constant R is set to a low value as can be understood from the above description.

What is claimed is:

1. An audio processing device for processing a plurality of audio signals generated by a plurality of sound receiving devices, the audio processing device comprising:
    a target sound emphasis part adapted to generate a target sound emphasized component by identifying a target sound component from the plurality of audio signals generated by the plurality of sound receiving devices and emphasizing the target sound component, each of the audio signals containing a target sound component from a target in a predetermined direction and a non-target sound component;
    a stereo processing part adapted to generate a stereo component of a plurality of channels from the plurality of audio signals;
    a first adjustment part adapted to adjust a sound pressure level of the target sound emphasized component generated by the target sound emphasis part according to a first adjustment value;
    a second adjustment part adapted to adjust a sound pressure level of the stereo component generated by the stereo processing part according to a second adjustment value;
    a first mixing part adapted to mix the target sound emphasized component adjusted by the first adjustment part and the stereo component adjusted by the second adjustment part with each other;
    a variable setting part adapted to variably set a zoom value which is changeable between a wide angle side and a telephoto side in relation to the target; and
    an adjustment control part adapted to control the first adjustment value according to the zoom value such that the sound pressure level of the target sound emphasized component adjusted by the first adjustment part exponentially decreases as the zoom value changes toward the wide-angle side, and to control the second adjustment value according to the zoom value such that the sound pressure level of the stereo component adjusted by the second adjustment part increases as the zoom value changes toward the wide-angle side.

2. The audio processing device according to claim 1, further comprising a room constant setting part adapted to variably set a room constant which represents an acoustic feature of surroundings of the target, the acoustic feature being dependent on sound absorption coefficients or wall areas of the surroundings,
    wherein the adjustment control part is adapted to control the first adjustment value and the second adjustment value according to the room constant such that a ratio of the sound pressure level of the stereo component to the sound pressure level of the target sound emphasized component decreases as the room constant increases.

3. The audio processing device according to claim 1, wherein the stereo processing part comprises:
    a first processor configured to generate a first intermediate signal based on the sum of the audio signals;
    a second processor configured to generate a second intermediate signal based on the difference between the audio signals;
    an adder configured to sum the first intermediate signal generated by the first processor and the second intermediate signal generated by the second processor to generate a right channel component of the stereo component; and
    a subtractor configured to subtract the second intermediate signal from the first intermediate signal to generate a left channel component of the stereo component.

4. The audio processing device according to claim 1, wherein the target sound emphasis part comprises:
    a component separation part adapted to separate the target sound component and the non-target sound component from each other contained in the plurality of audio signals;
    a third adjustment part adapted to adjust a sound pressure level of the target sound component generated through separation by the component separation part according to a third adjustment value;
    a fourth adjustment part adapted to adjust a sound pressure level of the non-target sound component generated through separation by the component separation part according to a fourth adjustment value; and
    a second mixing part adapted to mix the target sound component adjusted by the third adjustment part and the non-target sound component adjusted by the fourth adjustment part, thereby outputting the target sound emphasized component, wherein the adjustment control part is adapted to control the third adjustment value according to the zoom value such that the sound pressure level of the target sound component adjusted by the third adjustment part exponentially decreases as the zoom value changes toward the wide-angle side, and to control the fourth adjustment value according to the zoom value such that the sound pressure level of the non-target sound component adjusted by the fourth adjustment part increases as the zoom value changes toward the wide-angle side.

5. The audio processing device according to claim 4, wherein the target sound emphasis part comprises a fluctuating sound suppressor configured to suppress a fluctuating non-target sound in the non-target sound component adjusted by the fourth adjustment part.

6. The audio processing device according to claim 5, wherein the fluctuating sound suppressor comprises a noise estimator configured to generate a suppression gain series, and a suppression processor configured to suppress the fluctuating non-target sound by adjusting a strength at each frequency of the non-target sound component according to each gain of the suppression gain series.

7. The audio processing device according to claim 4, further comprising a room constant setting part adapted to variably set a room constant which represents an acoustic feature of surroundings of the target, the acoustic feature being dependent on sound absorption coefficients or wall areas of the surroundings, wherein the adjustment control part is adapted to control the third adjustment value and the fourth adjustment value according to the room constant such that a ratio of the sound pressure level of the non-target sound component to the sound pressure level of the target sound component decreases as the room constant increases.

8. The audio processing device according to claim 1, further comprising an output adjustment part adapted to adjust a sound pressure level of a mixture of the target sound emphasized component and the stereo component provided from the first mixing part according to an output adjustment value, wherein the adjustment control part is adapted to control the output adjustment value according to the zoom value such that the sound pressure level of the mixture of the target sound emphasized component and the stereo component increases as the zoom value changes toward the telephoto side beyond a predetermined zoom value, and such that the sound pressure level of the mixture of the target sound emphasized component and the stereo component is kept constant when the zoom value is not set beyond the predetermined zoom value.

9. A machine readable storage medium for use in a computer, the medium storing a program executable by the computer for processing a plurality of audio signals generated by a plurality of sound receiving devices, said program comprising the steps of:

generating a target sound emphasized component by identifying a target sound component from the plurality of audio signals generated by the plurality of sound receiving devices and emphasizing the target sound component, each of the audio signals containing a target sound component from a target in a predetermined direction and a non-target sound component;

generating a stereo component of a plurality of channels from the plurality of audio signals;

adjusting a sound pressure level of the target sound emphasized component according to a first adjustment value;

adjusting a sound pressure level of the stereo component according to a second adjustment value;

mixing the target sound emphasized component adjusted according to the first adjustment value and the stereo component adjusted according to the second adjustment value with each other;

variably setting a zoom value which is changeable between a wide angle side and a telephoto side in relation to the target;

controlling the first adjustment value according to the zoom value such that the sound pressure level of the target sound emphasized component adjusted by the first adjustment value exponentially decreases as the zoom value changes toward the wide-angle side; and controlling the second adjustment value according to the zoom value such that the sound pressure level of the stereo component adjusted by the second adjustment value increases as the zoom value changes toward the wide-angle side.

10. An audio processing device for processing a plurality of audio signals generated by a plurality of sound receiving devices, the audio processing device comprising an arithmetic processing unit configured to:

generate a target sound emphasized component by identifying a target sound component from the plurality of audio signals generated by the plurality of sound receiving devices and emphasizing the target sound component, each of the audio signals containing a target sound component from a target in a predetermined direction and a non-target sound component;

generate a stereo component of a plurality of channels from the plurality of audio signals;

adjust a sound pressure level of the target sound emphasized component according to a first adjustment value;

adjust a sound pressure level of the stereo component according to a second adjustment value;

mix the adjusted target sound emphasized component and the adjusted stereo component with each other;

variably set a zoom value which is changeable between a wide angle side and a telephoto side in relation to the target; and control the first adjustment value according to the zoom value such that the adjusted pressure level of the target sound emphasized component exponentially decreases as the zoom value changes toward the wide-angle side, and control the second adjustment value according to the zoom value such that the adjusted sound pressure level of the stereo component increases as the zoom value changes toward the wide-angle side.

* * * * *